United States Patent
He et al.

(10) Patent No.: US 11,592,842 B1
(45) Date of Patent: Feb. 28, 2023

(54) FLAPPING-WING AERIAL ROBOT FORMATION CONTROL METHOD

(71) Applicant: University of Science and Technology Beijing, Beijing (CN)

(72) Inventors: Wei He, Beijing (CN); Xiaoyang Wu, Beijing (CN); Xinyue Tang, Beijing (CN); Qiang Fu, Beijing (CN); Yongbin Sun, Beijing (CN); Yao Zou, Beijing (CN); Xiuyu He, Beijing (CN); Hui Zhang, Beijing (CN); Changyin Sun, Beijing (CN); Yaonan Wang, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 17/730,232

(22) Filed: Apr. 27, 2022

(30) Foreign Application Priority Data

Sep. 13, 2021 (CN) .......................... 202111065723.6

(51) Int. Cl.
  *G05D 1/10* (2006.01)
  *B64C 33/00* (2006.01)
(52) U.S. Cl.
  CPC .............. *G05D 1/104* (2013.01); *B64C 33/00* (2013.01)
(58) Field of Classification Search
  CPC ................................ G05D 1/104; B64C 33/00
  See application file for complete search history.

(56) References Cited

U.S. PATENT DOCUMENTS

| 11,307,598 B2* | 4/2022 | Aldarwish | ............ B64C 39/024 |
| 2014/0214243 A1* | 7/2014 | Whitehead | .............. B64C 19/00 701/3 |

(Continued)

FOREIGN PATENT DOCUMENTS

| CN | 107703966 A | 2/2018 |
| CN | 109491403 A | 3/2019 |

(Continued)

OTHER PUBLICATIONS

Yin Zhao, et al., Efficient Formation of Flapping-wing Aerial Vehicles Based on Wild Geese Queue Effect, Acta Automatica Sinica, 2021, pp. 1355-1367, vol. 47, No. 6.

(Continued)

*Primary Examiner* — Faris S Almatrahi
*Assistant Examiner* — Abdalla A Khaled
(74) *Attorney, Agent, or Firm* — Bayramoglu Law Offices LLC (57) ABSTRACT

A flapping-wing aerial robot formation control method includes: determining a trailing vortex generation mechanism, an energy saving principle and a trailing vortex attenuation mechanism of the formation flight of a group of wild geese in accordance with the pattern of the formation flight of the group of wild geese; determining the formation flight of a group of flapping-wing aerial robots and a formation switching solution in accordance with the trailing vortex generation mechanism, energy saving principle and trailing vortex attenuation mechanism of the formation flight of the group of wild geese in conjunction with the flapping characteristic of a flapping-wing aerial robot from the perspective of energy consumption equalization and energy saving; and carrying out formation keeping control and formation reconfiguration control in accordance with the formation flight of the group of flapping-wing aerial robots (Continued)

and the formation switching solution by controlling positions of the group of flapping-wing aerial robots.

5 Claims, 7 Drawing Sheets

(56) References Cited

U.S. PATENT DOCUMENTS

| 2017/0269612 A1* | 9/2017 | Frolov ..................... G01P 5/10 |
| 2019/0004544 A1* | 1/2019 | Feldmann ............ G08G 5/0091 |
| 2019/0033893 A1* | 1/2019 | Duan ................... G05D 1/0088 |

FOREIGN PATENT DOCUMENTS

| CN | 110162097 A | 8/2019 |
| CN | 110347181 A | 10/2019 |
| CN | 112699622 A | 4/2021 |

OTHER PUBLICATIONS

He Wei, et al., System design and experiment of an independently driven bird-like flapping-wing robot, Control Theory & Applications, 2022, pp. 12-22, vol. 39, No. 1.

\* cited by examiner

FIG. 11

FLAPPING-WING AERIAL ROBOT FORMATION CONTROL METHOD

CROSS REFERENCE TO THE RELATED APPLICATIONS

This application is based upon and claims priority to Chinese Patent Application No. 202111065723.6, filed on Sep. 13, 2021, the entire contents of which are incorporated herein by reference.

TECHNICAL FIELD

The present invention relates to the field of bionic robots, and in particular, to a flapping-wing aerial robot formation control method.

BACKGROUND

With their rapid development, bionic robots have drawn much interest and attention of domestic and foreign researchers in various fields. Among them, the bird-like flapping-wing aerial robot as a new branch of the bionic robots is a comprehensive cutting-edge interdiscipline integrated mechanics, mechanical science, materials science, signaling theory, control theory, etc, which has the advantages of light weight, high agility, high energy utilization rate, good stealthiness, etc. and is capable of flying at low altitude for a long time, so it has a broad application prospect in the fields of military reconnaissance and civilian monitoring.

On the other hand, with the increasing complexity of flight missions, higher standards and requirements have been put forward for the performance (such as maneuverability, rapidness, etc.) of flapping-wing aerial robots in performing tasks in large areas, and it is often difficult for a single flapping-wing aerial robot to perform a specified task. As a group of flapping-wing aerial robots perform a task (such as a reconnaissance or rescue task, particularly a long-time reconnaissance task or a long-distance rescue task), the group of flapping-wing aerial robots may usually encounter the problems of insufficient endurance, excessively low efficiency in performing the task, etc. Therefore, when a complex group task is performed, how to make full use of the overall advantage of a group of flapping-wing aerial robots, decrease the requirement on the performance of each flapping-wing aerial robot, increase energy utilization efficiency in the whole process of flight and increase the overall endurance of the group by reasonably forming a formation of the group of flapping-wing aerial robots under the premise of the endurances of the individual flapping-wing aerial robots reaching the limit need to be taken into consideration from the perspective of efficient energy utilization, so as to ensure reliability in performing the task.

At present, there are few researches on the control of the formation of a group of flapping-wing aerial robots, particularly those on an energy-saving mechanism of a bionic group formation inspired by creatures.

SUMMARY

An embodiment of the present invention provides a flapping-wing aerial robot formation control method, which can save flight energy, increase the overall endurance of a group of flapping-wing aerial robots, and realize efficient energy utilization. The technical solution is as follows:

An embodiment of the present invention provides a flapping-wing aerial robot formation control method, which includes:

determining a trailing vortex generation mechanism, an energy saving principle and a trailing vortex attenuation mechanism of the formation flight of a group of wild geese;

determining the formation flight of a group of flapping-wing aerial robots and a formation switching solution in accordance with the trailing vortex generation mechanism, energy saving principle and trailing vortex attenuation mechanism of the formation flight of the group of wild geese in conjunction with the flapping characteristic of a flapping-wing aerial robot from the perspective of energy consumption equalization and energy saving; and carrying out formation keeping control and formation reconfiguration control in accordance with the formation flight of the group of flapping-wing aerial robots and the formation switching solution obtained by controlling the positions of the group of flapping-wing aerial robots.

Further, the determining a trailing vortex generation mechanism of the formation flight of a group of wild geese in accordance with the pattern of the formation flight of the group of wild geese includes:

a pair of vortex-shaped airflows (called trailing vortexes) generated behind the wings of each wild goose as the wild geese fly in the group formation, wherein an induced velocity V of the trailing vortexes generated by the wild goose is expressed as:

$$V = \frac{\Phi \Gamma}{2\pi r_c}$$

wherein $r_c$ denotes a distance from the wing of the wild goose to the vortex line of the trailing vortex; $\Phi$ denotes a unit vector orthogonal to $r_c$; and $\Gamma$ denotes a trailing vortex intensity corresponding to the unit length of the trailing vortex, and is expressed as:

$$\Gamma = \frac{2UC_L S}{\pi b}$$

wherein U denotes a fluid velocity, S denotes a wing surface area of the wild goose, $C_L$ denotes a lift coefficient of the wild goose, and b denotes a wingspan length of the wild goose.

Further, determining an energy saving principle of the formation flight of a group of wild geese in accordance with the pattern of their formation pattern includes:

a downwash airflow generated at the inner side of the trailing vortex and an upwash airflow generated at the outer side of the trailing vortex, and a rear wild goose capable of utilizing the lifting force brought by the upwash airflow when flying in the upwash airflow, wherein an average induced upwash airflow velocity $\overline{V}_y$ of the tail vortexes generated by the front wild goose acting on the rear wild goose in the transverse direction is expressed as:

$$\overline{V}_y = \frac{\Gamma}{4\pi b}\left[\ln\frac{\left(\frac{y}{b}\right)^2+\left(\frac{z}{b}\right)^2}{\left(\frac{y}{b}-\frac{\pi}{4}\right)^2-\left(\frac{z}{b}\right)^2} - \ln\frac{\left(\frac{y}{b}+\frac{\pi}{4}\right)^2+\left(\frac{z}{b}\right)^2}{\left(\frac{y}{b}\right)^2+\left(\frac{z}{b}\right)^2}\right]$$

wherein y denotes a horizontal distance between the front wild goose and the rear wild goose, and z denotes a vertical distance between the front wild goose and the rear wild goose;

with the obtained $\nabla_y$, determining total lift $L_{total}$ and total drag $D_{total}$ received by the rear wild goose, which are expressed as:

$$\begin{cases} L_{total} = L + \Delta L \\ D_{total} = D - \Delta D \end{cases}$$

wherein L and D denote the lift and drag of the wild goose that flies alone, respectively, $\Delta L$ and $\Delta D$ denote a lift variation and a drag variation as a result of the influence of the trailing vortex of the front wild goose on the rear wild goose, respectively, and $\Delta T$, and $\Delta D$ are expressed as:

$$\begin{cases} \Delta L = qS\Delta C_L \\ \Delta D = qS\Delta C_D \end{cases}$$

wherein q is a dynamic pressure received by the rear wild goose, and $\Delta C_L$ and $\Delta C_D$ denote a lift coefficient and a drag coefficient of the rear wild goose, respectively; when both $\Delta C_L$ and $\Delta C_D$ take maximum values, the rear wild goose obtains a maximum total lift and receives a minimum total drag, and $\Delta C_L$ and $\Delta C_D$ are expressed as:

$$\Delta C_L = \frac{2SC_L a_W}{\pi^4 b^2}\left[\ln\frac{\left(\frac{y}{b}\right)^2+\left(\frac{z}{b}\right)^2+\mu^2}{\left(\frac{y}{b}-\frac{\pi}{4}\right)^2-\left(\frac{z}{b}\right)^2+\mu^2}-\ln\frac{\left(\frac{y}{b}+\frac{\pi}{4}\right)^2+\left(\frac{z}{b}\right)^2+\mu^2}{\left(\frac{y}{b}\right)^2+\left(\frac{z}{b}\right)^2+\mu^2}\right]$$

$$\Delta C_D = \frac{2C_L}{\pi^4 b^2}\left[\ln\frac{\left(\frac{y}{b}\right)^2+\left(\frac{z}{b}\right)^2+\mu^2}{\left(\frac{y}{b}-\frac{\pi}{4}\right)^2-\left(\frac{z}{b}\right)^2+\mu^2}-\ln\frac{\left(\frac{y}{b}+\frac{\pi}{4}\right)^2+\left(\frac{z}{b}\right)^2+\mu^2}{\left(\frac{y}{b}\right)^2+\left(\frac{z}{b}\right)^2+\mu^2}\right]$$

wherein $a_W$ denotes a slope of a curve corresponding to the lift received by the rear wild goose, and $\mu$ is an auxiliary term.

Further, determining a trailing vortex attenuation mechanism of the formation flight of a group of wild geese in accordance with their formation pattern includes:

in accordance with the pattern of the formation flight of the group of wild geese, determining an attenuation formula for the trailing vortex intensity generated by the front wild goose:

$$\Gamma(x, f) = \frac{2\pi^2 Af}{G}\sin\left[2\pi\left(\frac{x}{\lambda}-\delta+\frac{1}{4}\right)\right]$$

wherein x denotes a longitudinal distance between the front wild goose and the rear wild goose, A denotes a flapping amplitude of the front wild goose, f denotes a flapping frequency of the front wild goose, $\lambda$ denotes a wavelength of the trailing vortex, and both $\delta$ and G denote coefficient constants.

Further, determining the formation flight of the group of flapping-wing aerial robots and a formation switching solution in accordance with the trailing vortex generation mechanism, energy saving principle and trailing vortex attenuation mechanism of the formation flight of the group of wild geese in conjunction with the flapping characteristic of a flapping-wing aerial robot from the perspective of energy consumption equalization and energy saving includes:

in accordance with the trailing vortex generation mechanism and energy saving principle of the formation flight of the group of wild geese, obtaining a pattern of the formation flight of a group of flapping-wing aerial robots: V-shaped leading-following group pattern;

fitting data of an experimental result of the flapping-wing aerial robots in a wind tunnel, and in accordance with the attenuation formula for the trailing vortex intensity and a fitting result, determining a relationship between a lift-to-drag ratio of the rear flapping-wing aerial robot affected by the trailing vortex of the front flapping-wing aerial robot and a longitudinal distance between the front flapping-wing aerial robot and the rear flapping-wing aerial robot, which is expressed as:

$$R(x, f) = \frac{2\pi^2 Afx}{G}\sin(2\pi fx)+\Lambda$$

wherein R denotes a lift-to-drag ratio of the rear flapping-wing aerial robot affected by the trailing vortex of the front flapping-wing aerial robot, and $\Lambda$ denotes a lift-to-drag ratio received by the rear flapping-wing aerial robot that flies alone;

when the flapping frequency of the front flapping-wing aerial robot changes, adjusting the leading-following group pattern in accordance with the formula $$R(x, f) = \frac{2\pi^2 Afx}{G}\sin(2\pi fx)+\Lambda,$$

so as to ensure that the upwash airflow generated by the leading flapping wings provides the following robot with the maximum additional lift and the minimum additional drag; and constructing a leading robot swapping solution based on energy consumption equalization for the phenomenon of unequalized energy consumption of the leading robot and the following robots during the formation flight of the group of flapping-wing aerial robots, so as to equalize the energy consumption of the group of flapping-wing aerial robots.

Further, as the group of flapping-wing aerial robots fly in the formation, the foremost flapping-wing aerial robot acts as a leader for all the other flapping-wing aerial robots, which act as followers and are numbered, respectively, according to an arrangement order, so as to perform leading robot swapping in turn according to the order of the numbers.

Further, constructing a leading robot swapping solution based on energy consumption equalization for the phenomenon of unequalized energy consumption of the leading robot and the following robots during the formation flight of the group of flapping-wing aerial robots, so as to equalize their energy consumption includes:

in the whole process of the formation flight of the group of flapping-wing aerial robots, all the flapping-wing aerial robots acquire the position information and energy consumption of one another, and each time when the energy consumption of the leading robot reaches a present threshold or lower, employing the leading robot swapping solution based on energy consumption equalization to transform the current V-shaped pattern into another V-shaped pattern, so as to equalize the energy consumption of the group of flapping-wing aerial robots.

Further, carrying out formation keeping control and formation reconfiguration control in accordance with the formation flight of the group of flapping-wing aerial robots and the formation switching solution obtained by controlling the positions of the group of flapping-wing aerial robots includes:

performing non-linear dynamic modeling for controlling the position loop of the group of flapping-wing aerial robots to obtain a dynamic model of the positions of the group of flapping-wing aerial robots, which is expressed as:

$$M_{pi}\ddot{q}_{pi}+G_{pi}=r_i^{IB}\tau_{pi}-u_{pi}-F_{pi}$$

wherein $M_{pi}$ denotes an inertia matrix of the i th flapping-wing aerial robot; $\ddot{q}_{pi}$ denotes the second derivative of $q_{pi}$ against time t, and $q_{pi}$ denotes a position state of the i th flapping-wing aerial robot under an inertial coordinate system; $G_{pi}$ denotes a gravity vector of the i th flapping-wing aerial robot; $u_{pi}$ denotes an additional lift and drag of the i th flapping-wing aerial robot affected by the trailing vortex; $F_{pi}$ denotes an air drag received by the i th flapping-wing aerial robot; $r_i^{IB}$ denotes a coordinate transformation matrix of the i th flapping-wing aerial robot from the inertial coordinate system to a body coordinate system; and $\tau_{pi}$ denotes a controller corresponding to the i th flapping-wing aerial robot, and is expressed as:

$$\tau_{pi} = -K_p\sum(q_{pi} - q_{pj} - \varepsilon_{ij}^*) - K_v\sum(\dot{q}_{pi} - \dot{q}_{pj})$$

wherein $K_p$ and $K_v$ denote control gain matrices, $\varepsilon_{ij}^*$ denotes an optimal position offset between the i th flapping-wing aerial robot and the j th flapping-wing aerial robot, $\dot{q}_{pi}$ and $\dot{q}_{pj}$ denote velocities of the i th flapping-wing aerial robot and the j th flapping-wing aerial robot respectively, and $q_{pj}$ denotes a position state of the j th flapping-wing aerial robot under the inertial coordinate system;

each time when the energy consumption of the leading robot reach a present threshold or lower, employing the leading robot swapping solution based on energy consumption equalization to perform formation switching, and adjusting the value of $\varepsilon_{ij}^*$ according to a switched formation to realize formation reconfiguration.

The technical solution according to the embodiment of the present invention at least brings the following beneficial effects:

In the embodiment of the present invention, a trailing vortex generation mechanism, an energy saving principle and a trailing vortex attenuation mechanism of the formation flight of a group of wild geese are determined in accordance with the pattern of the formation flight of the group of wild geese; the formation flight of a group of flapping-wing aerial robots and a formation switching solution are determined in accordance with the trailing vortex generation mechanism, energy saving principle and trailing vortex attenuation mechanism of the formation flight of the group of wild geese in conjunction with the flapping characteristic of a flapping-wing aerial robot from the perspective of energy consumption equalization and energy saving; and formation keeping control and formation reconfiguration control are carried out in accordance with the formation flight of the group of flapping-wing aerial robots and the formation switching solution obtained by controlling the positions of the group of flapping-wing aerial robots. Thus, taking the group of wild geese as a bionic object, on the basis of the trailing vortex generation mechanism, energy saving principle and trailing vortex attenuation mechanism of the formation flight of the group of wild geese, a V-shaped leading-following group pattern that are capable of saving flight energy is obtained to ensure the optimality of the overall energy consumption of the group, and the leading robot swapping solution based on energy consumption equalization is created to ensure the balance of the overall energy consumption of the group, thereby increasing the overall endurance of the group of flapping-wing aerial robots and realizing efficient energy utilization.

BRIEF DESCRIPTION OF THE DRAWINGS

In order to more clearly illustrate the technical solutions in the embodiments of the present invention, the accompanying figures which are required to be used in the description of the embodiments will be introduced briefly below. Apparently, the accompanying figures described below are merely some embodiments of the present invention, and those of ordinary skill in the art can also obtain other accompanying figures according to these accompanying figures without making creative efforts.

DETAILED DESCRIPTION OF THE EMBODIMENTS

In order to make the objective, technical solutions and advantages of the present invention clearer, implementations of the present invention will be further described in detail below with reference to the accompanying figures.

Figure 1:
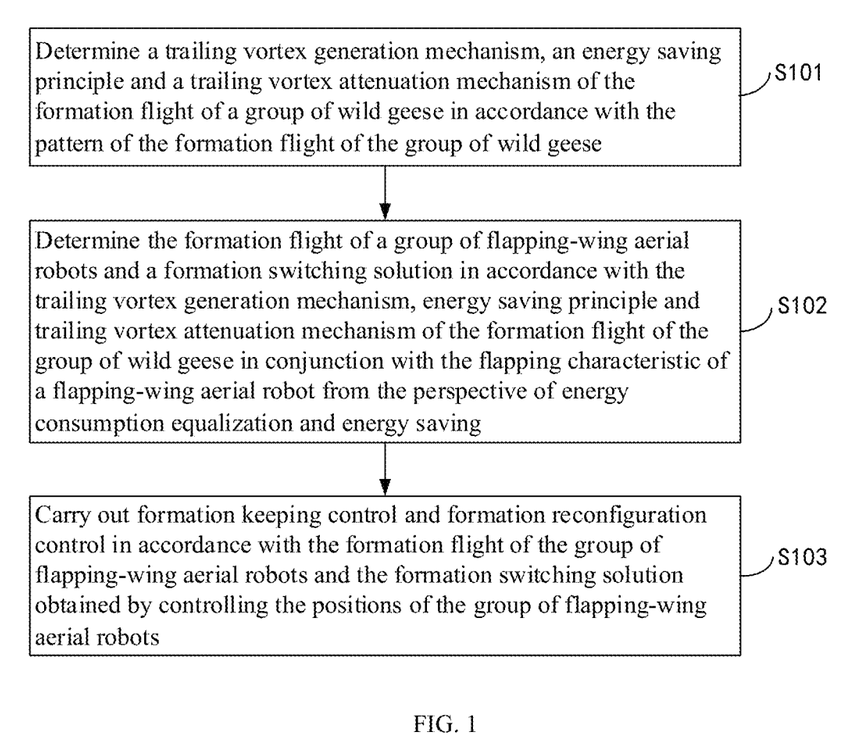
FIG. 1 is a schematic flowchart of a flapping-wing aerial robot formation control method according to an embodiment of the present invention.
Figure 2:
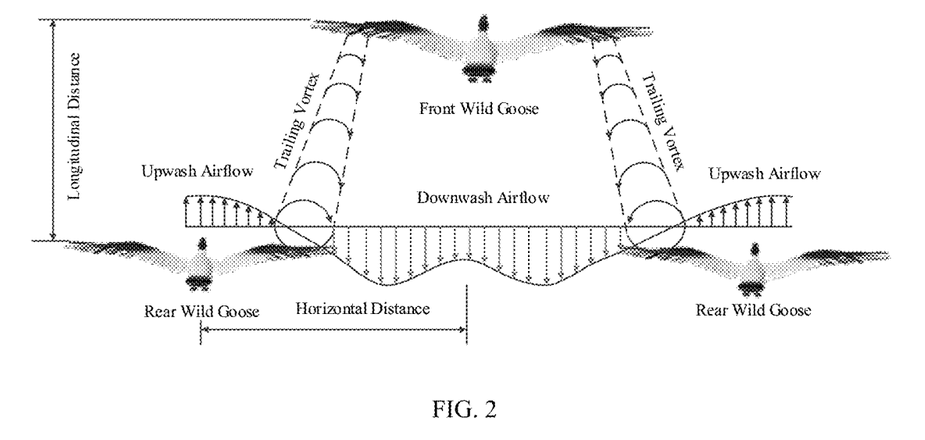
FIG. 2 is a schematic diagram of the generation of trailing vortexes by the flight of a group of wild geese according to an embodiment of the present invention.

As shown in FIG. 1, an embodiment of the present invention provides a flapping-wing aerial robot formation control method, including:

(S101) determining a trailing vortex generation mechanism, an energy saving principle and a trailing vortex attenuation mechanism of the formation flight of a group of wild geese i;

The formation flight of a group of wild geese is a common phenomenon existing in nature, and is a survival skill for social creatures having experienced long-term evolution to adapt to living environments. During migration, considering from the perspective of efficient energy utilization, a group of wild geese need to keep a V-shaped pattern or a straight line-shaped pattern (as shown in FIG. 2) and regularly exchange positions to act as a leading wild goose when flying in a group formation, in order to realize long-distance migration. Mainly, as the wild geese fly in the group formation, a pair of vortex-shaped airflows, called trailing vortexes, are generated behind the wings of each wild goose. Based on the past experience of studying these trailing vortexes, a distance between the pair of trailing vortexes generated by the flying wild goose can be obtained, which is about πb/4. According to the Biot-Savart law, an induced velocity V of the trailing vortexes generated by the wild goose is expressed as:

$$V = \frac{\Phi \Gamma}{2\pi r_c}$$

wherein $r_c$ denotes a distance from the wing of the wild goose to the vortex line of the trailing vortex; $\Phi$ denotes a unit vector orthogonal to $r_c$; $\Gamma$ denotes a trailing vortex intensity corresponding to the unit length of the trailing vortex, and according to the Kutta-Joukowski theorem, $\Gamma$ is expressed as:

$$\Gamma = \frac{2UC_L S}{\pi b}$$

wherein U denotes a fluid velocity, S denotes a wing surface area of the wild goose, $C_L$ denotes a lift coefficient of the wild goose, and b denotes a wingspan length of the wild goose.

Figure 3:
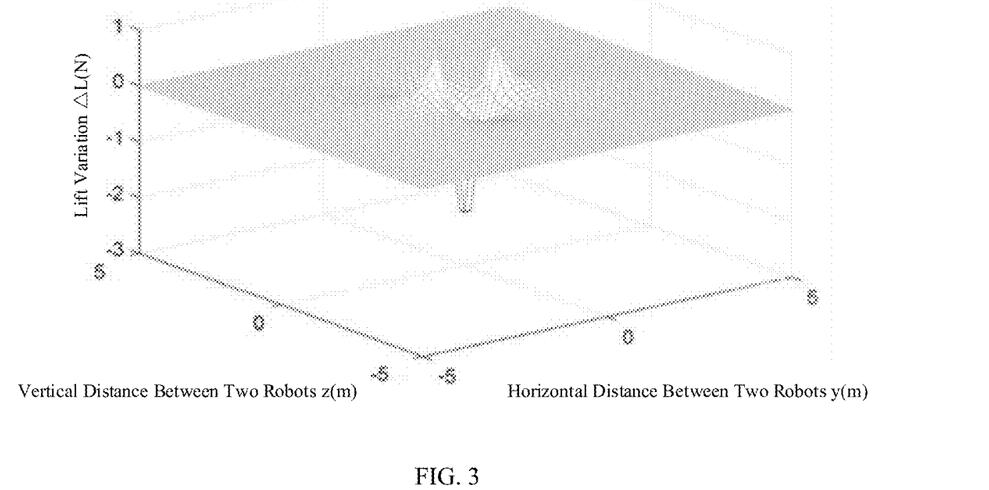
FIG. 3 is a schematic three-dimensional diagram of the change of lift with respect to a horizontal distance and a vertical distance according to an embodiment of the present invention.
Figure 4:
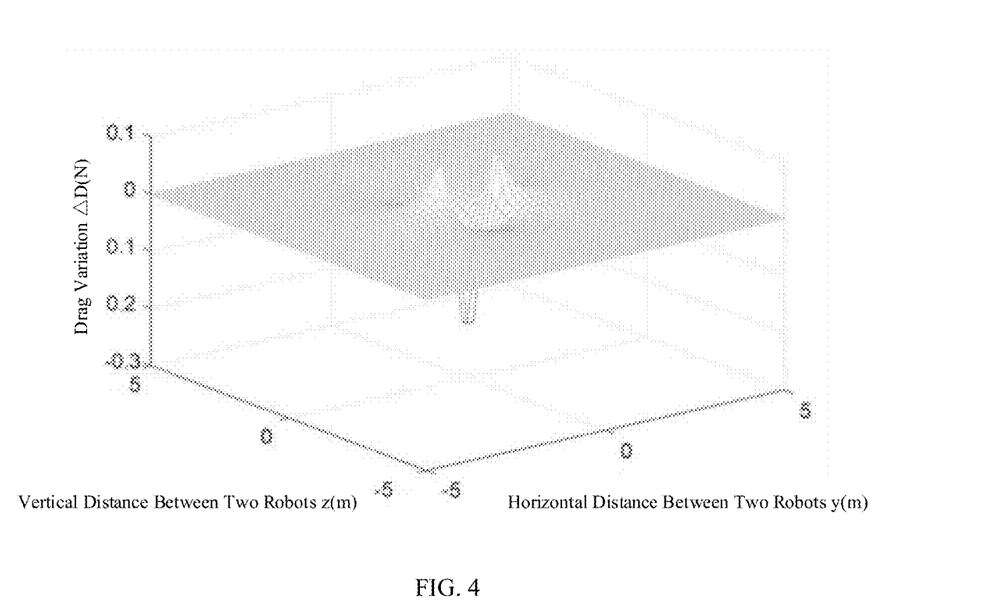
FIG. 4 is a schematic three-dimensional diagram of the change of drag with respect to the horizontal distance and the vertical distance according to an embodiment of the present invention.

A downwash airflow is generated at the inner side of the trailing vortex, and an upwash airflow is generated at the outer side of the trailing vortex. A rear wild goose can sufficiently utilize the lifting force brought by the upwash airflow when flying in the upwash airflow, so that the rear wild goose can use less energy to fly, saving its flight energy, relieving flight fatigue, exerting collective advantages and effectively increasing the flight endurance of the group of wild geese, and thereby long-distance migration can be realized. This process is called a "wild goose queue effect". An average induced upwash airflow velocity $\overline{V}_y$ of the tail vortexes generated by the front wild goose acting on the rear wild goose in the transverse direction is expressed as:

$$\overline{V}_y = \frac{\Gamma}{4\pi b}\left[\ln\frac{\left(\frac{y}{b}\right)^2 + \left(\frac{z}{b}\right)^2}{\left(\frac{y}{b} - \frac{\pi}{4}\right)^2 - \left(\frac{z}{b}\right)^2} - \ln\frac{\left(\frac{y}{b} + \frac{\pi}{4}\right)^2 + \left(\frac{z}{b}\right)^2}{\left(\frac{y}{b}\right)^2 + \left(\frac{z}{b}\right)^2}\right]$$

wherein Y denotes a horizontal distance between the front wild goose and the rear wild goose, and z is a vertical distance between the front wild goose and the rear wild goose;

with the obtained $\overline{V}_y$, determining total lift $L_{total}$ and total drag $D_{total}$ received by the rear wild goose, which are expressed as:

$$\begin{cases} L_{total} = L + \Delta L \\ D_{total} = D - \Delta D \end{cases}$$

wherein L and D denote the lift and drag of the front wild goose that flies alone, respectively, $\Delta L$ and $\Delta D$ denote a lift variation and a drag variation as a result of the influence of the trailing vortex of the front wild goose on the rear wild goose, respectively, and a schematic diagram of a relationship between the change of lift and the horizontal distance and a schematic diagram of a relationship between the change of drag and the horizontal distance are shown in FIG. 3 and FIG. 4. After the rear wild goose is affected by the upwash airflow, it obtains a maximum total lift $L_{total}$ and receives a minimum total drag $D_{total}$, thus achieving the objective of increasing the flight efficiency and reducing its energy consumption. $\Delta L$ and $\Delta D$ are expressed as:

$$\begin{cases} \Delta L = qS\Delta C_L \\ \Delta D = qS\Delta C_D \end{cases}$$

wherein q is a dynamic pressure received by the rear wild goose; $\Delta C_L$ and $\Delta C_D$ denote a lift coefficient and a drag coefficient of the rear wild goose, respectively; when both $\Delta C_L$ and $\Delta C_D$ take maximum values, the rear wild goose obtains a maximum total lift and receives a minimum total drag, and $\Delta C_L$ and $\Delta C_D$ are expressed as:

$$\Delta C_L = \frac{2SC_L a_W}{\pi^4 b^2}\left[\ln\frac{\left(\frac{y}{b}\right)^2 + \left(\frac{z}{b}\right)^2 + \mu^2}{\left(\frac{y}{b} - \frac{\pi}{4}\right)^2 - \left(\frac{z}{b}\right)^2 + \mu^2} - \ln\frac{\left(\frac{y}{b} + \frac{\pi}{4}\right)^2 + \left(\frac{z}{b}\right)^2 + \mu^2}{\left(\frac{y}{b}\right)^2 + \left(\frac{z}{b}\right)^2 + \mu^2}\right]$$

$$\Delta C_D = \frac{2C_L}{\pi^4 b^2}\left[\ln\frac{\left(\frac{y}{b}\right)^2 + \left(\frac{z}{b}\right)^2 + \mu^2}{\left(\frac{y}{b} - \frac{\pi}{4}\right)^2 - \left(\frac{z}{b}\right)^2 + \mu^2} - \ln\frac{\left(\frac{y}{b} + \frac{\pi}{4}\right)^2 + \left(\frac{z}{b}\right)^2 + \mu^2}{\left(\frac{y}{b}\right)^2 + \left(\frac{z}{b}\right)^2 + \mu^2}\right]$$

wherein $a_W$ denotes a slope of a curve corresponding to the lift received by the rear wild goose; and $\mu$ is an auxiliary term, playing a role in preventing the denominator from being 0.

The above analysis result can provide a theoretical basis for the research of the formation of a group of flapping-wing aerial robots and the reduction of the overall energy consumption of their formation flight.

In accordance with the pattern of the formation flight of the group of wild geese, a change in the trailing vortex intensity generated by the front wild goose with factors, such as a longitudinal distance between the front wild goose and the rear wild goose, a flapping frequency of the front wild goose, etc., is determined to obtain an attenuation formula:

$$\Gamma(x, f) = \frac{2\pi^2 Af}{G}\sin\left[2\pi\left(\frac{x}{\lambda} - \delta + \frac{1}{4}\right)\right]$$

wherein x denotes a longitudinal distance between the front wild goose and the rear wild goose, A denotes a flapping amplitude of the front wild goose, f denotes a flapping frequency of the front wild goose, λ denotes a wavelength of the trailing vortex, and both $$\delta = 1 - \frac{\lambda}{2\pi} \text{ and } G = e^{-2\pi f}$$

denote coefficient constants.

It should be noted that when applied to a flapping-wing aerial robot, the above formula may express the corresponding physical meaning of the flapping-wing aerial robot, for example, S denotes a wing surface area, and $a_W$ denotes a wing lift curve slope.

(S102) based on the trailing vortex generation mechanism, energy saving principle and trailing vortex attenuation mechanism of the formation flight of the group of wild geese which are obtained by the present embodiment inspired by the flight pattern of the group of wild geese and enlightened by the "wild goose queue effect", in conjunction with the flapping characteristic of a flapping-wing aerial robot, determining the formation flight of a group of flapping-wing aerial robots and a formation switching solution from the perspective of energy consumption equalization and energy saving, which may specifically include the following steps:

(A1) in accordance with the trailing vortex generation mechanism and energy saving principle of the formation flight of the group of wild geese, obtaining a pattern of the formation flight of a group of flapping-wing aerial robots: V-shaped leading-following group pattern; that is, the energy-saving flight principle of the group of wild geese may be adopted for reference to arrange the pattern of the group of flapping-wing aerial robots into a V shape, forming the V-shaped "leading-following" group pattern in which the foremost flapping-wing aerial robot acts as a leading robot for all the rear flapping-wing aerial robots that act as following robots and are numbered, respectively, according to an arrangement order, and thereby a complete group leading-following structure as a guiding reference is formed, as shown in FIG. 5;

in the present embodiment, the normal flapping frequency of flight of the flapping-wing aerial robot is usually 3 Hz to 5 Hz, and an optimal longitudinal distance under this flapping frequency may be obtained as 1b-1.5b according to formula $$R(x, f) = \frac{2\pi^2 A f x}{G} \sin(2\pi f x) + \Lambda.$$

Figure 5:
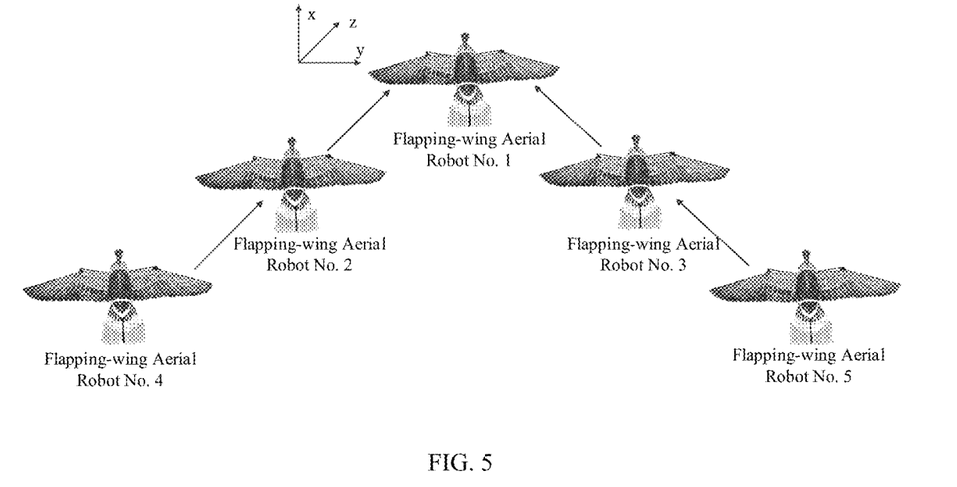
FIG. 5 is a schematic diagram of the arrangement of a formation of a group of flapping-wing aerial robots according to an embodiment of the present invention.

In addition, according to the relative three-dimensional distances (i.e., the horizontal distance of πb/4, the longitudinal distance of 1b-1.5b (adjusted according to different flapping frequencies) and the vertical distance of 0) between the front flapping-wing aerial robot and the rear flapping-wing aerial robot described in S101, all the flapping-wing aerial robots are arranged to form the formation shown in FIG. 5, which is an optimal group formation. In order to differentiate the leading robot and the following robots, the flapping-wing aerial robots are numbered from 1 to 5 according to the arrangement in FIG. 5, with the flapping-wing aerial robot No. 1 being the leading robot and the flapping-wing aerial robots No. 2 to No. 5 being the following robots.

According to the above optimal group formation, it can be ensured that the upwashairflow generated by the leading robot that flaps the wings can provide the following robots with the maximum additional lift and the minimum additional drag. It can be seen from FIG. 5 that the corresponding maximum lift variation is ΔL=0.5763N and the maximum drag variation is ΔD=0.0703N.

Figure 6:
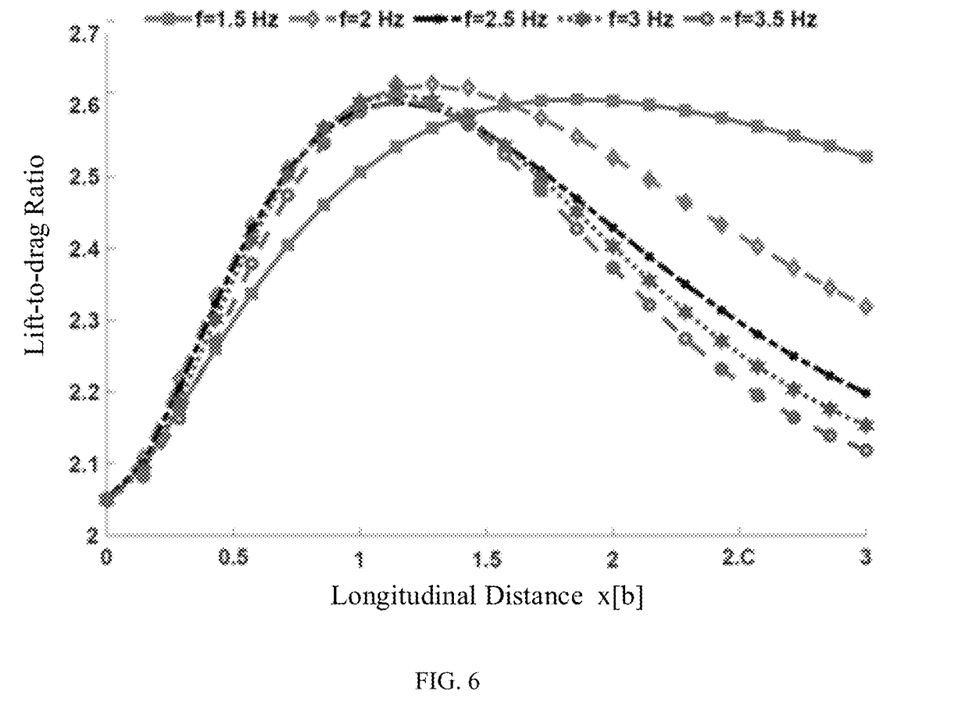
FIG. 6 is a schematic diagram of a relationship between the change of a lift-to-drag ratio and a longitudinal distance according to an embodiment of the present invention.

(A2) fitting data of an experimental result (including: a relationship between a lift-to-drag ratio and the longitudinal distance, a relationship between the lift-to-drag ratio and the horizontal distance, a relationship between the lift-to-drag ratio and the flapping frequency and a relationship between the lift-to-drag ratio and the flapping amplitude) of the flapping-wing aerial robots in a wind tunnel, and in accordance with the attenuation formula for the trailing vortex intensity and a fitting result, determining a relationship between the lift-to-drag ratio of the rear flapping-wing aerial robot affected by the trailing vortex of the front flapping-wing aerial robot and the longitudinal distance between the front flapping-wing aerial robot and the rear flapping-wing aerial robot, which is expressed as:

$$R(x, f) = \frac{2\pi^2 A f x}{G} \sin(2\pi f x) + \Lambda$$

wherein R denotes a lift-to-drag ratio of the rear flapping-wing aerial robot affected by the trailing vortex of the front flapping-wing aerial robot, and Λ denotes a lift-to-drag ratio received by the rear flapping-wing aerial robot that flies alone;

With the increase of the flapping frequency of the front wild goose, the optimal longitudinal distance between the front wild goose and the rear wild goose gradually decreases. Therefore, with a change in the flapping frequency of the front wild goose, the group pattern will also be adjusted according to formula $$R(x, f) = \frac{2\pi^2 A f x}{G} \sin(2\pi f x) + \Lambda.$$

(A3) when the flapping frequency of the front flapping-wing aerial robot changes, adjusting the leading-following group pattern in accordance with the formula $$R(x, f) = \frac{2\pi^2 A f x}{G} \sin(2\pi f x) + \Lambda,$$

so as to ensure that the upwash airflow generated by the leading robot that flaps wings provides the following robot with the maximum additional lift and the minimum additional drag;

(A4) constructing a leading robot swapping solution based on energy consumption equalization for the phenomenon of unequalized energy consumption of the leading robot and the following robots during the formation flight of the group of flapping-wing aerial robots, so as to equalize the energy consumption of the group of flapping-wing aerial robots.

In the present embodiment, the group of flapping-wing aerial robots are constrained by the changeable environment and limited energy during flight, so the group of flapping-wing aerial robots need to adopt an appropriate formation when performing a formation flight task. At the same time, with the increase of flight distance, energy shortage and mechanical wear will occur, so the formation needs to be changed to equalize the energy consumption of all the flapping-wing aerial robots, so as to ensure that the flapping-wing aerial robots will not encounter the problem of mechanical failure.

Figure 7:
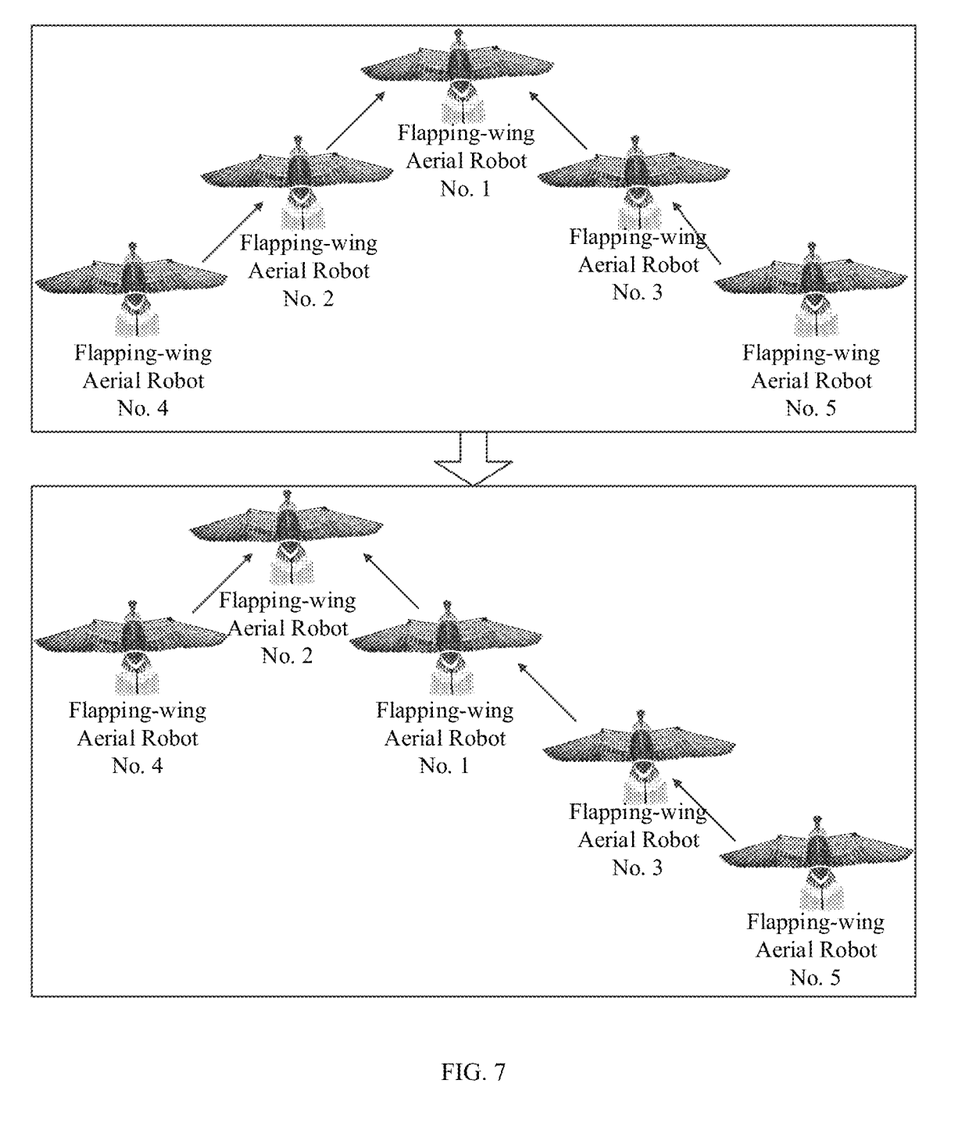
FIG. 7 is a schematic diagram of the formation transformation of the group of flapping-wing aerial robots according to an embodiment of the present invention.

In the present embodiment, the long-range migration process of the wild geese is mainly adopted for reference in the design of a group formation and formation switching solution for the group of the flapping-wing aerial robots. During the long-range migration of the wild geese, the rear wild goose will fly to one side behind the front wild goose, so as to save flight energy by using the lifting force generated by the front wild goose that flaps the wings. Therefore, the group of wild geese present an orderly V-shaped pattern or straight line-shaped pattern. At the same time, with the extension of a flight route, because the front wild goose cannot get additional lifting force brought by the upwash airflow, energy consumption will be higher than that of the rear wild geese, and therefore, the leading wild goose will be changed to equalize the overall energy consumption of the group of wild geese. Taking this phenomenon as a solution design inspiration, the present embodiment designs an energy consumption-oriented formation switching solution according to different energy consumptions and different interferences of the external environment, which is specifically as follows:

Considering the fact that the leading robot consumes more energy than the rear following robots during the formation flight of the group of flapping-wing aerial robots, it is necessary to perform swap according to energy consumption. Taking the "leading wild goose switching" mechanism of wild geese in nature as reference, the present embodiment puts forward an "energy consumption distribution-based leading robot swap" solution for the formation of a group of flapping-wing aerial robots with the "wild goose queue effect" as reference. In the whole process of the formation flight of the group of flapping-wing aerial robots, all the flapping-wing aerial robots can acquire the position information and energy consumption of one another through communication transmission devices, and each time when the energy consumption of the leading robot reach a present threshold (e.g., 50%) or lower, the leading robot swapping solution based on energy consumption equalization is employed to transform the current V-shaped pattern into another V-shaped pattern, as shown in FIG. 7. Leading robot swapping is performed in turn according to the order of numbers to ensure the balance of energy consumption of the group of flapping-wing aerial robots, thus realizing efficient energy utilization.

In the present embodiment, with the group of wild geese as a bionic object, how the rear wild goose utilizes the upwash airflow generated by the front wild goose that flaps the wings to save its flight energy is studied by analyzing the V-shaped arrangement structure principle of the formation flight of the group of wild geese, so that a flapping-wing aerial robot group formation flight solution that is capable of saving flight energy (i.e. adopting a V-shaped leading-following group pattern to fly) is obtained according to the flight characteristics of the group of flapping-wing aerial robots, and a leading robot swapping solution based on energy consumption equalization is constructed, thereby increasing the flight endurance of the group of flapping-wing aerial robots.

(S103) carrying out formation keeping control and formation reconfiguration control in accordance with the formation flight of the group of flapping-wing aerial robots and the formation switching solution obtained by controlling the positions of the group of flapping-wing aerial robots.

On the basis of ensuring the rationality of the result, the present embodiment makes the following assumptions:

(1) a position control system of each flapping-wing aerial robot is controlled by three independent control variables respectively;

(2) the control of an attitude loop is temporarily ignored in the control of the formation of the group of flapping-wing aerial robots;

(3) the front flapping-wing aerial robot and the rear flapping-wing aerial robot are not affected by each other's electromagnetic interference and other factors.

Figure 8:
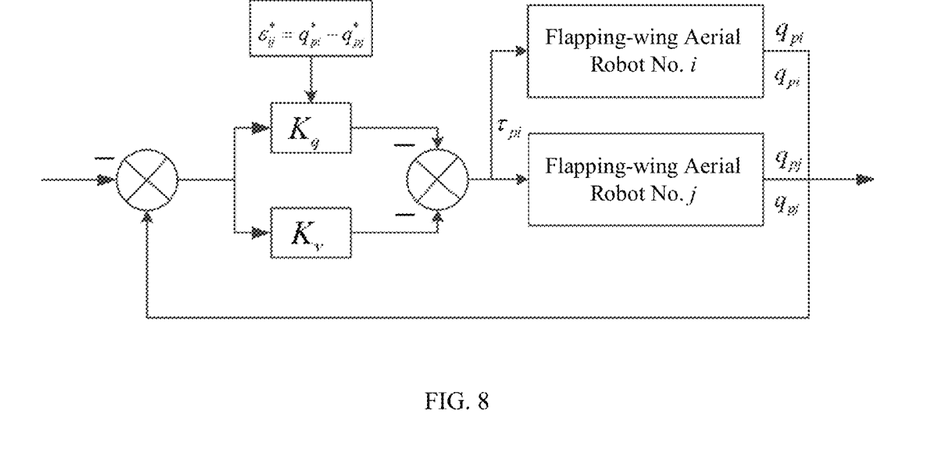
FIG. 8 is a schematic diagram of a principle of controlling the formation of the group of flapping-wing aerial robots according to an embodiment of the present invention.

Under the above assumptions, taking a stable cruising flight state into consideration, the present embodiment performs non-linear dynamic modeling for controlling the position loop of each flapping-wing aerial robot among the group of flapping-wing aerial robots to obtain a dynamic model of the positions of the group of flapping-wing aerial robots, which is expressed as:

$$M_{pi}\ddot{q}_{pi} + G_{pi} = r_i^{IB}\tau_{pi} - u_{pi} - F_{pi}$$

wherein $\ddot{q}_{pi}$ is an abbreviated form of $\ddot{q}_{pi}(t)$, expressed as the second derivative of $q_{pi}$ against time t, and $q_{pi}=[x_i, y_i, z_i]^T$ denotes a position state of the i th flapping-wing aerial robot under an inertial coordinate system;

$$M_{pi} = \begin{bmatrix} m_i & 0 & 0 \\ 0 & m_i & 0 \\ 0 & 0 & m_i \end{bmatrix}$$

denotes an inertia matrix of the i th flapping-wing aerial robot; $G_{pi}$ [0, 0, $-m_i g$]$^T$ denotes a gravity vector of the i th flapping-wing aerial robot, $m_i$ denotes the weight of the i th flapping-wing aerial robot, and g denotes a gravitational acceleration; $u_{pi}=[-\Delta D_i, 0, \Delta L_i]^T$ denotes additional lift and drag of the i th flapping-wing aerial robot affected by the trailing vortex (if this flapping-wing aerial robot is a leading robot, this term is 0); $F_{pi}$ denotes an air drag received by the i th flapping-wing aerial robot, which may be regarded as an external disturbance; $r_i^{IB}$ denotes a coordinate transformation matrix of the i th flapping-wing aerial robot from the inertial coordinate system to a body coordinate system; and $\tau_{pi}$ denotes a controller of the i th flapping-wing aerial robot, as shown in FIG. 8, and is expressed as:

$$\tau_{pi}=K_p\Sigma(q_{pi}-q_{pj}-\varepsilon_{ij}*)-K_v\Sigma(\dot{q}_{pi}-\dot{q}_{pj})$$

wherein $K_p$ and $K_v$ denote control gain matrices, $\varepsilon_{ij}*=q_{pi}*-q_{pj}*$, denotes an optimal position offset between the i th flapping-wing aerial robot and the j th flapping-wing aerial robot, $q_{pi}*$ and $q_{pj}*$ denote desired positions of the i th flapping-wing aerial robot and the j th flapping-wing aerial robot respectively, $\dot{q}_{pi}$ and $\dot{q}_{pj}$ denote velocities of the i th flapping-wing aerial robot and the j th flapping-wing aerial robot, respectively, and $q_{pj}$ denotes a position of the j th flapping-wing aerial robot under the inertial coordinate system. The offset value $\varepsilon_{ij}*$ can be set according to the horizontal and longitudinal distances described in S102, which will further ensure that the group of flapping-wing aerial robots can fly in the present formation.

Each time when the energy consumption of the leading robot reaches a present threshold or lower, the leading robot swapping solution based on energy consumption equalization is employed to perform formation switching, and the value of $\varepsilon_{ij}^*$ is adjusted according to a switched pattern, ultimately realizing stable formation reconfiguration.

In the present embodiment, it is assumed that the preset threshold is 50%. When the energy consumption of the leading robot reaches 50% of its own energy, it is necessary to switch the formation, that is, "leading robot swapping". This process can ensure the balance of the overall energy consumption of the formation flight of the group of flapping-wing aerial robots, increase the flight endurance of the group of flapping-wing aerial robots, and increase the overall success rate of performing a task.

According to the flapping-wing aerial robot formation control method described in the embodiment of the present invention, a trailing vortex generation mechanism, an energy saving principle and a trailing vortex attenuation mechanism of the formation flight of a group of wild geese are determined; the formation flight of a group of flapping-wing aerial robots and a formation switching solution are determined in accordance with the trailing vortex generation mechanism, energy saving principle and trailing vortex attenuation mechanism of the formation flight of the group of wild geese in conjunction with the flapping characteristic of a flapping-wing aerial robot from the perspective of energy consumption equalization and energy saving; and formation keeping control and formation reconfiguration control are carried out in accordance with the formation flight of the group of flapping-wing aerial robots and the formation switching solution obtained by controlling the positions of the group of flapping-wing aerial robots. Thus, taking the group of wild geese as a bionic object, on the basis of the trailing vortex generation mechanism, energy saving principle and trailing vortex attenuation mechanism of the formation flight of the group of wild geese, a V-shaped leading-following group pattern that is capable of saving flight energy is obtained to ensure the optimality of the overall energy consumption of the group, and the leading robot swapping solution based on energy consumption equalization is created to ensure the balance of the overall energy consumption of the group, thereby increasing the overall endurance of the group of flapping-wing aerial robots and realizing efficient energy utilization.

Figure 10:
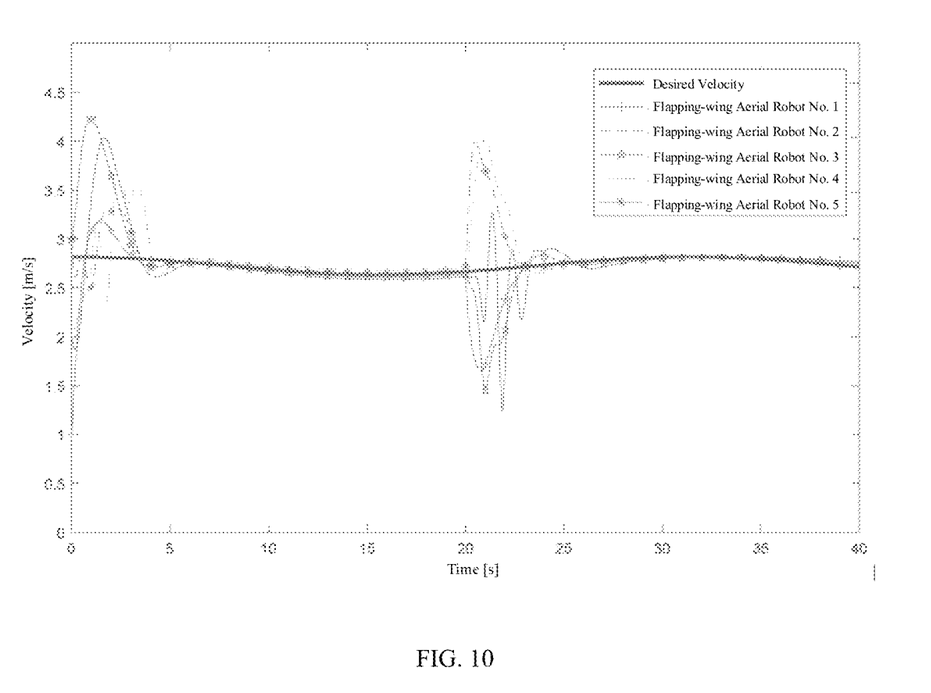
FIG. 10 is a schematic simulation diagram of the velocity of the formation flight of the group of flapping-wing aerial robots according to an embodiment of the present invention.
Figure 11:
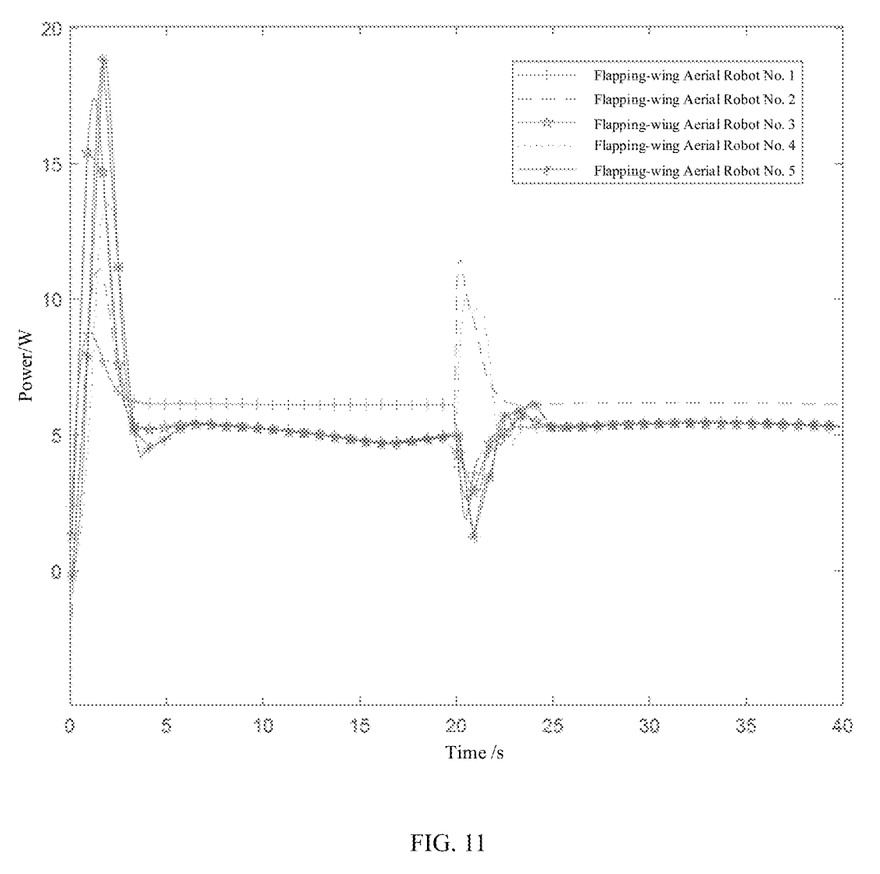
FIG. 11 is a schematic simulation diagram of the power consumption of the formation flight of the group of flapping-wing aerial robots according to an embodiment of the present invention.

The flapping-wing aerial robot formation control method according to the present embodiment can solve the problem of optimal energy control in the formation process of the group of flapping-wing aerial robots. Then, the effectiveness and stability of the flapping-wing aerial robot formation control method according to the present embodiment are verified by MATLAB simulation, and simulation results are shown in FIGS. 9 to 11.

Figure 9:
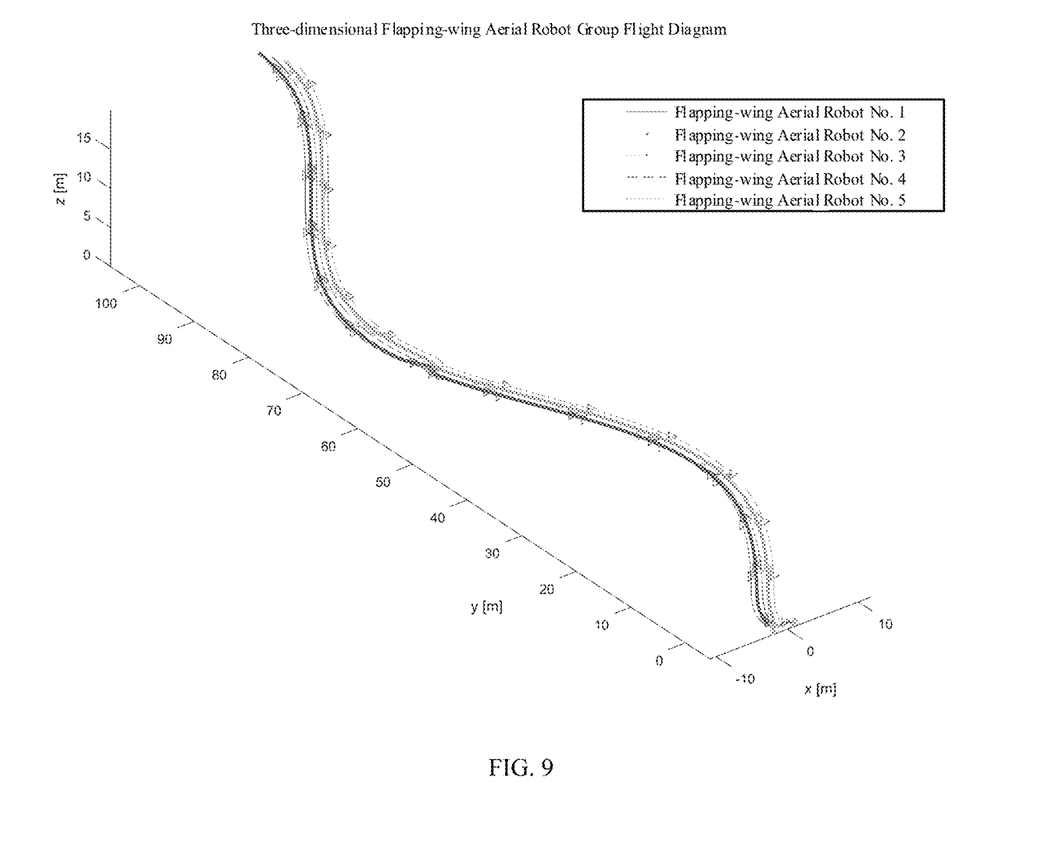
FIG. 9 is a schematic three-dimensional simulation diagram of the formation flight and formation transformation of the group of flapping-wing aerial robots according to an embodiment of the present invention.

As shown in FIG. 9, the three-dimensional simulation flight curves of the formation flight of five flapping-wing aerial robots in a group are consistent with the above theoretical results. The whole flight process has gone through a formation arrangement stage, a formation keeping stage and a formation reconfiguration stage.

The implementation of simulation in the present embodiment is divided into the following steps:

Step 1: Formation Arrangement

The flight distance y=—4m-5 m in FIG. 9 and the flight time t=0 s-5 s in FIG. 10 belong to formation arrangement. In this step, the flapping-wing aerial robots move from an initial random take-off position to a specified flight altitude, and a formation is arranged according to the optimal group formation solution in S102, with the flapping-wing aerial robot No. 1 as a leading robot, and at the same time, the flight velocity of each flapping-wing aerial robot has also reached a specified stable flight velocity.

Step 2: Formation Keeping y=5 m-55 m in FIG. 9 and t=5 s-20 s in FIG. 10 belong to formation keeping. In this step, the five flapping-wing aerial robots fly stably with the flapping-wing aerial robot No. 1 as the leading robot according to the optimal group formation solution in S102, and the flight velocities of all the flapping-wing aerial robots tend to be consistent.

Step 3: Formation Reconfiguration y=55 m-65 m in FIG. 9 and t=20 s-25 s in FIG. 10 belong to formation reconfiguration. In this step, the formation of the five flapping-wing aerial robots is reconfigured according to the "leading robot swapping" solution in S102, arranged with the flapping-wing aerial robot No. 2 as the leading robot, so as to achieve the objective of reducing the overall energy consumption of the group.

Step 4: Formation Keeping After Formation Reconfiguration y=65 m-105 m in FIG. 9 and t=25 s-40 s in FIG. 10 belong to formation keeping after formation reconfiguration. In this step, the five flapping-wing aerial robots fly stably after reconfiguration with the flapping-wing aerial robot No. 2 as the leading robot, and the flight velocities of all the flapping-wing aerial robots tend to be consistent. Finally, the formation keeping control and formation reconfiguration control of the formation of the group of flapping-wing aerial robots are realized.

While the present embodiment meets the control objective, the present invention studies the energy saving mechanism of the formation flight of the group of flapping-wing aerial robots. The formula for calculating the energy consumption $P_i$ (specifically, power consumption) of a flapping-wing aerial robot is as follows:

$$P_i = \tau_{pi} \dot{q}_{pi}$$

if the flapping-wing aerial robot is a leading robot, $u_{pi}=0$, and at this point, both $\tau_{pi}$ and $P_i$ are maximum values. Therefore, when flying according to the group formation solution described in S102, the energy consumption of the leading robot is maximum because it cannot get the influence of upwash airflow. The energy consumption of all the flapping-wing aerial robots corresponding to the group formation flight solution is shown in FIG. 11. It can be seen from FIG. 11 that the energy consumption of the leading robot is higher than that of the following robots at each stage, so according to the formation flight solution of the group of flapping-wing aerial robots based on the pattern of formation flight of a group of wild geese, the objective of reducing the overall energy consumption of the group of flapping-wing aerial robots can be effectively achieved.

What is described above is merely the preferred embodiment of the present invention, and is not used to limit the present invention, and any modifications, equivalent replacement, improvements and things like those which are made within the approach and principle of the present invention shall fall within the protection scope of the present invention.

What is claimed is:

1. A flapping-wing aerial robot formation control method, comprising:
   determining a trailing vortex generation mechanism, an energy saving principle and a trailing vortex attenuation mechanism of a formation flight of a group of wild geese in accordance with a pattern of the formation flight of the group of wild geese;

determining a formation flight and a formation switching solution of a group of flapping-wing aerial robots in accordance with the trailing vortex generation mechanism, the energy saving principle and the trailing vortex attenuation mechanism of the formation flight of the group of wild geese in conjunction with a flapping characteristic of a flapping-wing aerial robot of the group of flapping-wing aerial robots, from a perspective of energy consumption equalization and energy saving; and carrying out formation keeping control and formation reconfiguration control in accordance with the formation flight and the formation switching solution of the group of flapping-wing aerial robots by controlling positions of the group of flapping-wing aerial robots;

wherein determining the formation flight and the formation switching solution of the group of flapping-wing aerial robots in accordance with the trailing vortex generation mechanism, the energy saving principle and the trailing vortex attenuation mechanism of the formation flight of the group of wild geese in conjunction with the flapping characteristic of the flapping-wing aerial robot of the group of flapping-wing aerial robots, from the perspective of energy consumption equalization and energy saving comprises:

in accordance with the trailing vortex generation mechanism and the energy saving principle of the formation flight of the group of wild geese, obtaining a flight formation of the formation flight of the group of flapping-wing aerial robots, the flight formation being V-shaped leading-following group formation;

fitting data of an experimental result of the flapping-wing aerial robots in a wind tunnel, and in accordance with the attenuation formula for the trailing vortex intensity and a fitting result, determining a relationship between a lift-to-drag ratio of a rear flapping-wing aerial robot affected by the trailing vortex of a front flapping-wing aerial robot and a longitudinal distance between the front flapping-wing aerial robot and the rear flapping-wing aerial robot, wherein the relationship is expressed as:

$$R(x, f) = \frac{2\pi^2 A f x}{G} \sin(2\pi f x) + \Lambda$$

wherein R denotes the lift-to-drag ratio of the rear flapping-wing aerial robot affected by the trailing vortex of the front flapping-wing aerial robot, and $\Lambda$ denotes a lift-to-drag ratio received by the rear flapping-wing aerial robot when the rear flapping-wing aerial robot flies alone;

when a flapping frequency of the front flapping-wing aerial robot changes, adjusting the leading-following group formation in accordance with a formula $$R(x, f) = \frac{2\pi^2 A f x}{G} \sin(2\pi f x) + \Lambda,$$

so as to ensure that an upwash airflow generated by leading robot flapping wings provides a following robot with a maximum additional lift and a minimum additional drag; and constructing a leading robot swapping solution based on the energy consumption equalization for a phenomenon of un-equalized energy consumption of the leading robot and following robots during the formation flight of the group of flapping-wing aerial robots, so as to equalize the energy consumption of the group of flapping-wing aerial robots, wherein as the group of flapping-wing aerial robots fly in the formation, a foremost flapping-wing aerial robot acts as a leading robot for all rear flapping-wing aerial robots, and all the rear flapping-wing aerial robots act as following robots and are numbered, respectively according to an arrangement order, so as to perform leading robot swapping in turn according to the arrangement order of numbers, and a complete group leading-following structure as a guiding reference is formed;

wherein constructing the leading robot swapping solution based on the energy consumption equalization for the phenomenon of un-equalized energy consumption of the leading robot and the following robots during the formation flight of the group of flapping-wing aerial robots, so as to equalize the energy consumption of the group of flapping-wing aerial robots comprises:

in a whole process of the formation flight of the group of flapping-wing aerial robots, acquiring, by all the flapping-wing aerial robots, position information and energy consumption of one another through communication transmission devices in the flapping-wing aerial robots, and each time when an energy consumption of the leading robot increases to a present threshold or higher, employing the leading robot swapping solution based on the energy consumption equalization to transform a current V-shaped formation into another V-shaped formation, so as to equalize the energy consumption of the group of flapping-wing aerial robots.

2. The flapping-wing aerial robot formation control method of claim 1, wherein determining the trailing vortex generation mechanism of the formation flight of the group of wild geese in accordance with the pattern of the formation flight of the group of wild geese comprises:

a pair of vortex-shaped airflows (called trailing vortexes) generated behind wings of each wild goose as the wild goose flies in a group formation, wherein an induced velocity V of the trailing vortexes generated by the wild goose is expressed as:

$$V = \frac{\Phi \Gamma}{2\pi r_c}$$

wherein $r_c$ denotes a distance from the wing of the wild goose to a vortex line of the trailing vortex; $\Phi$ denotes a unit vector orthogonal to $r_c$; and $\Gamma$ denotes a trailing vortex intensity corresponding to a unit length of the trailing vortex, and $\Gamma$ is expressed as:

$$\Gamma = \frac{2UC_L S}{\pi b}$$

wherein U denotes a fluid velocity, S denotes a wing surface area of the wild goose, $C_L$ denotes a lift coefficient of the wild goose, and b denotes a wingspan of the wild goose.

3. The flapping-wing aerial robot formation control method of claim 2, wherein determining the energy saving principle of the formation flight of the group of wild geese in accordance with the pattern of the formation flight of the group of wild geese comprises:

when a downwash airflow is generated at an inner side of the trailing vortex and an upwash airflow is generated at an outer side of the trailing vortex, and a rear wild goose that is capable of utilizing a lifting force brought by the upwash airflow when flying in the upwash airflow, obtaining an average induced upwash airflow velocity $\bar{V}_y$ of trailing vortexes generated by the front wild goose acting on the rear wild goose in a transverse direction, wherein the average induced upwash airflow velocity $\bar{V}_y$ is expressed as:

$$\bar{V}_y = \frac{\Gamma}{4\pi b}\left[\ln\frac{\left(\frac{y}{b}\right)^2+\left(\frac{z}{b}\right)^2}{\left(\frac{y}{b}-\frac{\pi}{4}\right)^2-\left(\frac{z}{b}\right)^2} - \ln\frac{\left(\frac{y}{b}+\frac{\pi}{4}\right)^2+\left(\frac{z}{b}\right)^2}{\left(\frac{y}{b}\right)^2+\left(\frac{z}{b}\right)^2}\right]$$

wherein y denotes a horizontal distance between the front wild goose and the rear wild goose, and z denotes a vertical distance between the front wild goose and the rear wild goose;

in accordance with the obtained $\bar{V}_y$, determining a total lift $L_{total}$ and a total drag $D_{total}$ received by the rear wild goose, wherein $L_{total}$ and $D_{total}$ are expressed as:

$$\begin{cases} L_{total} = L + \Delta L \\ D_{total} = D - \Delta D \end{cases}$$

wherein L and D denote a lift and a drag of the front goose that flies alone, respectively, $\Delta L$ and $\Delta D$ denote a lift variation and a drag variation as a result of the influence of the trailing vortex of the front wild goose on the rear wild goose, respectively, and $\Delta L$ and $\Delta D$ are expressed as:

$$\begin{cases} \Delta L = qS\Delta C_L \\ \Delta D = qS\Delta C_D \end{cases}$$

wherein q is a dynamic pressure received by the rear wild goose; $\Delta C_L$ and $\Delta C_D$ denote a lift coefficient and a drag coefficient of the rear wild goose, respectively; when both $\Delta C_L$ and $\Delta C_D$ take maximum values, the rear wild goose obtains a maximum total lift and suffers a minimum total drag, $\Delta C_L$ and $\Delta C_D$ are expressed as:

$$\Delta C_L = \frac{2SC_L a_W}{\pi^4 b^2}\left[\ln\frac{\left(\frac{y}{b}\right)^2+\left(\frac{z}{b}\right)^2+\mu^2}{\left(\frac{y}{b}-\frac{\pi}{4}\right)^2-\left(\frac{z}{b}\right)^2+\mu^2} - \ln\frac{\left(\frac{y}{b}+\frac{\pi}{4}\right)^2+\left(\frac{z}{b}\right)^2+\mu^2}{\left(\frac{y}{b}\right)^2+\left(\frac{z}{b}\right)^2+\mu^2}\right]$$

$$\Delta C_D = \frac{2C_L}{\pi^4 b^2}\left[\ln\frac{\left(\frac{y}{b}\right)^2+\left(\frac{z}{b}\right)^2+\mu^2}{\left(\frac{y}{b}-\frac{\pi}{4}\right)^2-\left(\frac{z}{b}\right)^2+\mu^2} - \ln\frac{\left(\frac{y}{b}+\frac{\pi}{4}\right)^2+\left(\frac{z}{b}\right)^2+\mu^2}{\left(\frac{y}{b}\right)^2+\left(\frac{z}{b}\right)^2+\mu^2}\right]$$

wherein $a_W$ denotes a slope of a curve corresponding to the lift received by the rear wild goose, and $\mu$ is an auxiliary term.

4. The flapping-wing aerial robot formation control method of claim 1, wherein carrying out formation keeping control and formation reconfiguration control in accordance with the formation flight of the group of flapping-wing aerial robots and the formation switching solution by controlling the positions of the group of flapping-wing aerial robots comprises:

performing non-linear dynamic modeling for controlling a position loop of the group of flapping-wing aerial robots to obtain a dynamic model of the positions of the group of flapping-wing aerial robots, wherein the dynamic model is expressed as:

$$M_{pi}\ddot{q}_{pi}+G_{pi}=r_i^{IB}\tau_{pi}-u_{pi}-F_{pi}$$

wherein $M_{pi}$ denotes an inertia matrix of an i th flapping-wing aerial robot; $\ddot{q}_{pi}$ denotes a second derivative of $q_{pi}$ against time t, and $q_{pi}$ denotes a position state of the i th flapping-wing aerial robot under an inertial coordinate system; $G_{pi}$ denotes a gravity vector of the i th flapping-wing aerial robot; $u_{pi}$ denotes an additional lift and drag of the i th flapping-wing aerial robot affected by the trailing vortex; $F_{pi}$ denotes an air drag received by the i th flapping-wing aerial robot; $r_i^{IB}$ denotes a transformation matrix of the i th flapping-wing aerial robot from the inertial coordinate system to a body coordinate system; and $\tau_{pi}$ denotes a controller of the i th flapping-wing aerial robot, and is expressed as:

$$\tau_{pi}=K_p\Sigma(q_{pi}-q_{pj}-\varepsilon_{ij}^*)-K_v\Sigma(\dot{q}_{pi}-\dot{q}_{pj})$$

wherein $K_p$ and $K_v$ denote control gain matrices, $\varepsilon_{ij}^*$ denotes an optimal position offset between the i th flapping-wing aerial robot and a j th flapping-wing aerial robot, $\dot{q}_{pi}$ and $\dot{q}_{pj}$ denote velocity states of the i th flapping-wing aerial robot and the j th flapping-wing aerial robot, respectively, and $q_{pi}$ denotes a position state of the j th flapping-wing aerial robot under the inertial coordinate system;

each time when an energy consumption of the leading robot increases to a threshold or higher, employing the leading robot swapping solution based on the energy consumption equalization to perform formation switching, and adjusting a value of $\varepsilon_{ij}^*$ according to a switched formation to realize formation reconfiguration.

5. The flapping-wing aerial robot formation control method of claim 1, wherein determining the trailing vortex attenuation mechanism of the formation flight of the group of wild geese in accordance with the pattern of the formation flight of the group of wild geese comprises:

in accordance with the pattern of the formation flight of the group of wild geese, determining an attenuation formula for a trailing vortex intensity generated by a front wild goose:

$$\Gamma(x,f) = \frac{2\pi^2 Af}{G}\sin\left[2\pi\left(\frac{x}{\lambda}-\delta+\frac{1}{4}\right)\right]$$

wherein x denotes a longitudinal distance between the front wild goose and the rear wild goose, A denotes a flapping amplitude of the front wild goose, f denotes a flapping frequency of the front wild goose, $\lambda$ denotes a wavelength of a trailing vortex, and both $\delta$ and G denote coefficient constants.

* * * * *